Aug. 11, 1959 S. B. SPRACKLEN 2,899,258
TREND RECORDER
Filed Sept. 8, 1958 3 Sheets-Sheet 1

INVENTOR.
STANFORD BRUCE SPRACKLEN

BY HIS ATTORNEYS.
HARRIS, KIECH, FOSTER & HARRIS

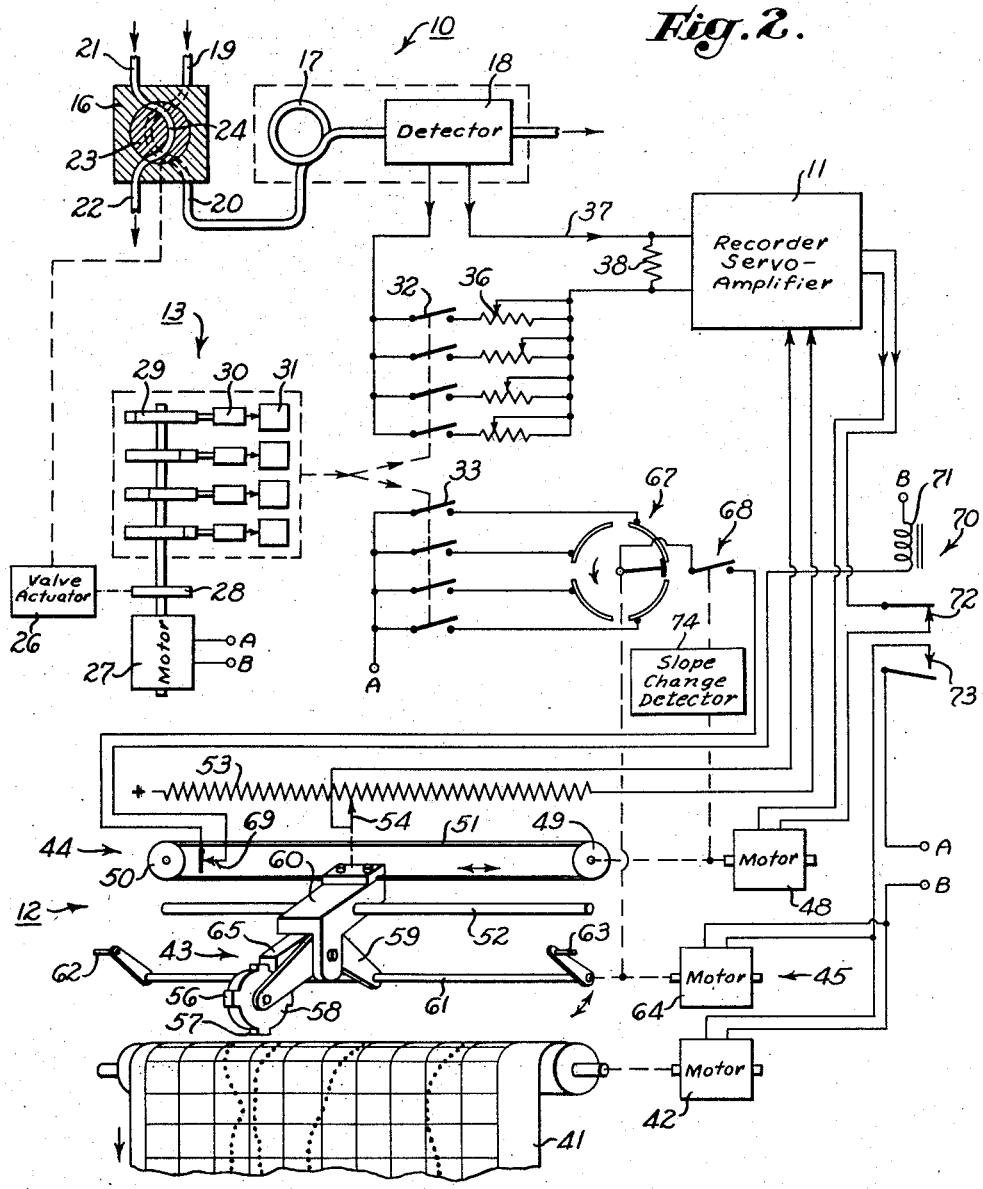

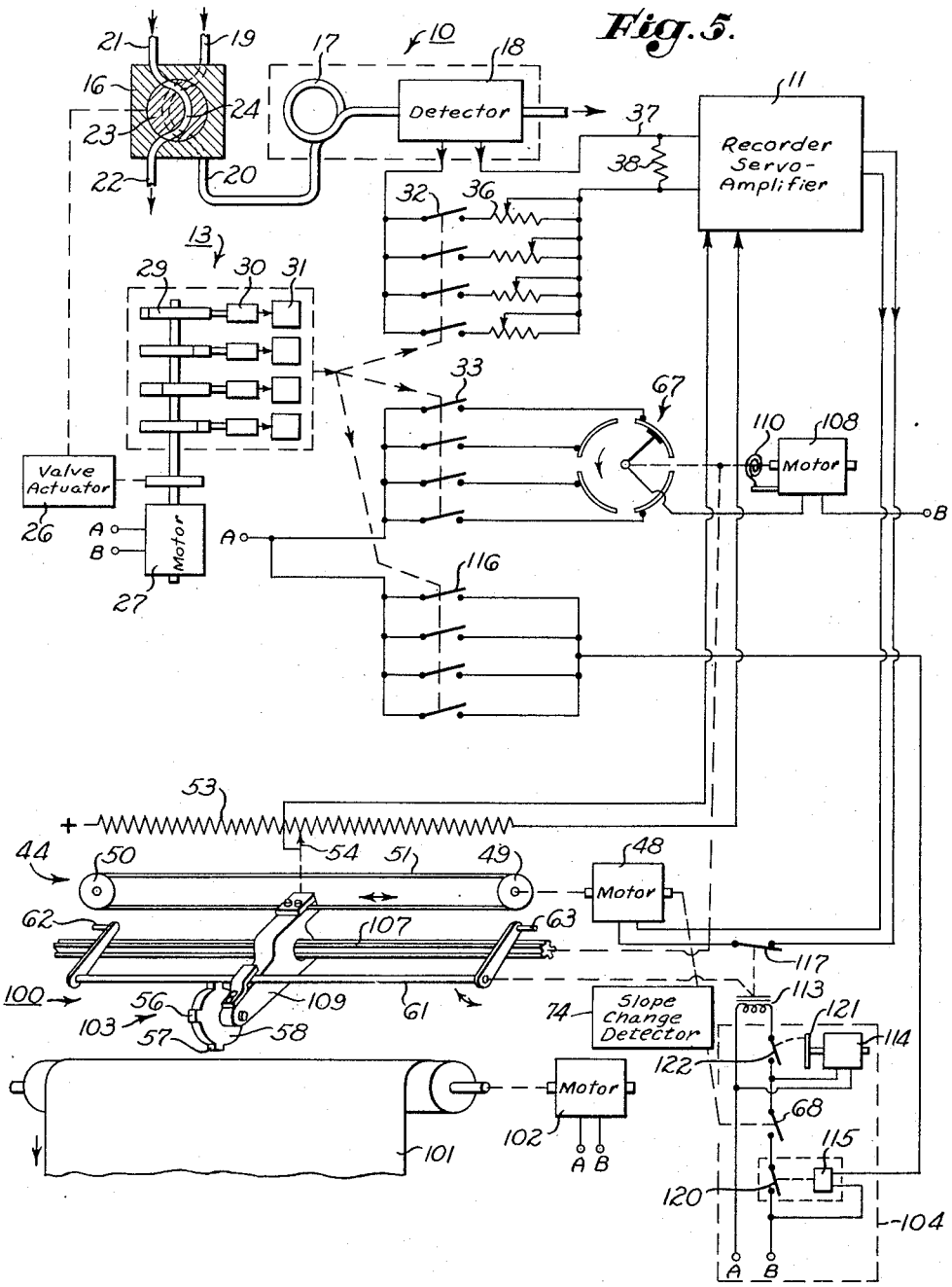

United States Patent Office 2,899,258
Patented Aug. 11, 1959

2,899,258

TREND RECORDER

Stanford Bruce Spracklen, Fullerton, Calif., assignor to Beckman Instruments, Inc., a corporation of California Application September 8, 1958, Serial No. 759,465

18 Claims. (Cl. 346—34)

This invention relates to signal recording systems and in particular to a system which records only the peak or maximum value of signals to provide an easily interpreted record of changes or trends in the signal magnitudes.

The invention is especially adapted for use with gas chromatographic instruments or the like, which produce a train of signal peaks for each sample analyzed. It is an object of the invention to provide a system for recording the peak value of a signal to provide a record of the trend of maximum value. A further object of the invention is to provide such a system for recording the trends of a plurality of signals which are cyclically introduced into the system. A further object is to provide such a system for use with instruments which produce a plurality of signals from a single sample with the apparatus of the invention selecting particular portions of the instrument output for trend recording.

A gas chromatograph is useful in monitoring the composition of process streams. In gas chromatography a quantity of sample is introduced into a chromatographic column and a carrier gas is passed through the column. The sample components are separated in the column and eluted therefrom one by one, each at a characteristic elapsed time. The eluent from the column passes through a detecting unit such as a thermal conductivity bridge, and each injection of sample generates a train of signal peaks quantitatively representing respectively the separate components of the sample. The elapsed time between sample injection and generation of a particular signal peak identifies the particular component and the magnitude of the peak provides a quantitative measure of the amount of this particular component in the sample. A plot of a typical output from a gas chromatograph is shown in Fig. 1.

In process monitoring, the sample injection is repeated at suitable intervals and the trend of the peaks of the components of interest are observed. The reading of trends from a repeated trace such as that of Fig. 1 is laborious and inconvenient. Such a record is filled with lines giving information which is largely redundant, since the information of interest ordinarily is only the peak height or maximum value of particular selected components.

It is accordingly an object of the invention to provide a signal trend recording system suitable for use with a gas chromatograph to provide a record of the maximum values only of selected components of the chromatograph output. A further object of the invention is to provide a trend recording system which may be used in conjunction with conventional commercial multipoint recorders. Another object of the invention is to provide a system for recording with conventional recorders such that only the peak values of a plurality of cyclically repeating signals are recorded.

It is an object of the invention to provide a trend recording system wherein signals are printed or recorded only at the value at which a change in sign of the slope of the signal occurs. A further object of the invention is to provide such a system wherein no recording occurs at the zero or minimum value of the signal.

The invention also comprises novel details of construction and novel combinations and arrangements of parts, together with other objects, advantages, features and results, which will more fully appear in the course of the following description. The drawings merely show and the description merely describes preferred embodiments of the present invention which are given by way of illustration or example.

In the drawings:

Fig. 2 is a schematic diagram showing a preferred embodiment of the invention;

Fig. 5 is a schematic representation of an alternative embodiment of the invention.

Figure 1:
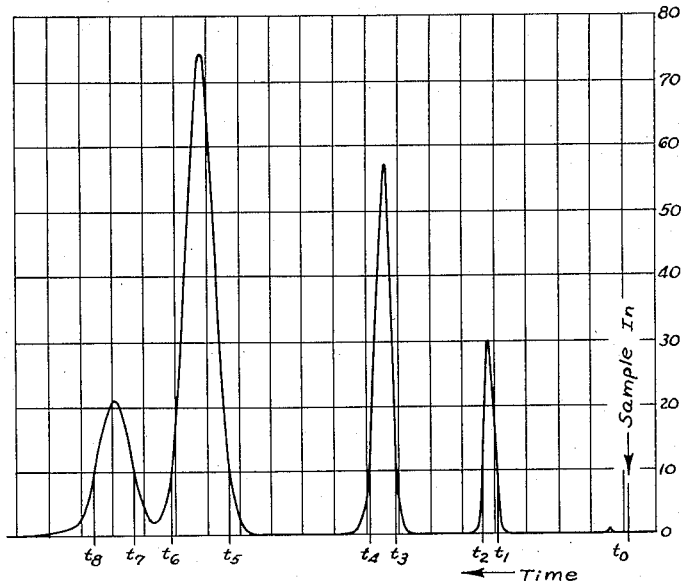
Fig. 1 is a typical plot of the output of a gas chromatograph for each sample injection when recorded continuously as a function of time.

The embodiment shown in Fig. 2 is a system for recording trends of the maximal values of four signal peaks in the output of a gas chromatograph. However, the recorder of the invention can be adapted for any number of peaks, which, of course, need not be consecutive as the system will select desired peaks while ignoring others. The system includes a sample analyzer or gas chromatograph 10, a servoamplifier 11, a recorder 12 and a programming system 13. The gas chromatograph may be of conventional design and comprises a sampling mechanism such as valve 16, a chromatographic column 17 and a detector 18. A stream of carrier gas such as helium is continuously passed through the chromatograph entering the sampling valve 16 at a port 19 and leaving the valve at a port 20. A stream of sample material passes through the sampling valve entering at a port 21 and exiting at a port 22, the sample stream then being vented or returned to the process stream. The sampling valve serves to introduce a reproducible quantity of sample into the chromatographic column. This is accomplished in the sampling mechanism shown by rotating the valve core 23 180° about its vertical axis to insert the passage 24 between the ports 19 and 20, the sample material contained in said passage being swept into the chromatographic column 17 by the stream of carrier gas. The sample is preferably injected rapidly so that the duration of injection time will be small relative to the duration of any of the output signals. Hence, the valve core is only momentarily rotated to the 180° position and is then returned to the normal position as shown in Fig. 2. Ordinarily, the sampling valve will be actuated at predetermined equal time intervals to introduce equal sized samples into the analyzer at a steady repetition rate. The valve core 23 is controlled by a valve actuator 26 which is energized from the programming system 13 in a manner to be described below. Each sample injection causes generation by the detector 18 of a train of signal peaks of the general form shown in Fig. 1. The time of sample injection is designated as $t_0$ in Fig. 1.

The programming system 13 provides cyclical operation of the recording system of the invention and also synchronizes the actuation of various elements of the recording system. The programming system is ordinarily made adjustable so that the recording system may be used for various samples or for recording different selected portions of the train of signal peaks. In general, the programming system synchronizes the operation of the sampling valve 16, the selection of portions of the output of the detector for recording and the selection and actuation of the markers in the recorder. The preferred form of the programming system illustrated herein includes a substantially constant speed motor 27 which drives an adjustable cam 28 and a set of adjustable cams 29. The cam 28 drives the valve actuator 26 to cyclically introduce samples into the gas chromatograph. Each cam 29 corresponds to a channel which is to be recorded, each cam actuating a corresponding switch 30 which in turn energizes a relay 31. Each relay has a first pair of normally open contacts 32 and a second pair of normally open contacts 33. Alternatively, of course, the cam 29 could directly actuate the contact pairs 32 and 33. However, the illustrated arrangement is preferred because of reliability of operation and flexibility of programming.

The programming system provides for connection of selected portions only of each train of signal peaks to the amplifier 11, while peaks that are not of interest may be wholly omitted. For example, the upper cam 29 is adjusted to close the corresponding switch 30 at the time $t_1$ (Fig. 1) and to open the switch at time $t_2$. Closing of the switch 30 energizes the corresponding relay 31 so that the corresponding contact pairs 32 and 33 are closed during the time interval $t_1$—$t_2$. The other cams are adjusted to close the corresponding switches at other desired time intervals, such as the intervals $t_3$—$t_4$, $t_5$—$t_6$ and $t_7$—$t_8$.

Each pair of contacts 32 is connected in series with a variable resistor 36 between one terminal of the output of the detector 18 and one terminal of the input of the amplifier 11, the other terminals of the detector and amplifier being directly connected by a line 37. A resistor 38 is connected across the input terminals of the amplifier 11 to maintain the amplifier input at zero when no signal is supplied via the contact sets 32. The variable resistors 36 serve as attenuators for the output of the detector, permitting adjustment of the individual signal portions to a suitable level for application to the amplifier and the recorder. The printed data separately representing the several peaks can be spaced at convenient intervals on the chart of the recorder and conveniently read. For example, when recording four peaks, the attenuators may be set to position the peak indications respectively at approximately the 20, 40, 60 and 80% of full scale deflections on the chart.

The recorder 12 includes a chart 41, a chart drive motor 42, a chart marker assembly or printing head 43 for marking on the chart, a chart marker drive 44 for traversing the marker assembly across the chart, and a printing circuit 45 for actuating the chart marker.

The chart marker drive 44 includes a balance motor 48, spaced wheels 49, 50 and a cable 51 mounted on the spaced wheels with one of the wheels being driven by the motor 48. The chart marker assembly 43 slides laterally on a fixed rod 52 and is clamped to the cable 51. The output of the amplifier 11 drives the balance motor 48 to move the chart marker assembly along the rod 52, traversing the assembly across the chart a distance proportional to the signal applied to the amplifier. A moving arm 54 of a potentiometer 53 is coupled to the marker assembly for movement in conjunction therewith to provide a feedback signal to the servoamplifier.

The chart marker assembly or printing head 43 includes individual marker elements shown as printing studs 56, 57 mounted on a printing wheel 58. The studs print different indicia such as the numbers 1 through 4 when pressed against the chart 41. Conventional inking means may be provided for inking the printing stud. The printing wheel 58 is supported on a rocker arm 59 which in turn is pivoted on a carriage 60. The rocker arm is actuated for pressing a stud against the chart by a bar 61 pivotally mounted at points 62, 63. A suitable mechanism contained within a portion 65 of the printing head acts to advance the next printing stud into printing position as the bar 61 returns to its initial position following actuation. The bar 61 is actuated by a motor 64 which is a part of the printing circuit 45.

In addition to the motor 64, the printing circuit includes the contact pairs 33, a selector switch 67, a two-position switch 68, a zero print prevent switch 69, and a relay 70. In the preferred form shown herein, the selector switch 67 is of the rotating type with its fixed contacts connected respectively to one terminal of each of the contact pairs 33 and its rotating contact connected to one terminal of the switch 68. The motor 64 is coupled to the rotating contact of the switch 67 so that when the bar 61 is actuated to print on the chart, the selector switch will be advanced to the next position. The selector switch is preferably of the shorting or make-before-break type so that upon disengagement with one fixed contact the rotating contact is already engaged with the next fixed contact.

The contact sets 33, the selector switch 67, the switches 68 and 69, and a coil 71 of a relay 70 are connected in series across power source terminals A, B. The relay 70 includes a normally closed contact set 72 connected in series between the output of the amplifier 11 and the balance motor 48 and a normally open contact set 73 for connecting the motors 42 and 64 to the power source terminals A, B.

Figure 3:
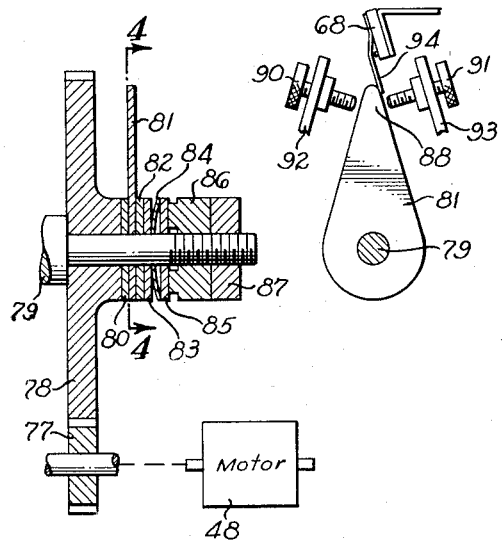
Fig. 3 is an enlarged sectional view of a portion of the instrument of Fig. 2.
Figures 4, 6:
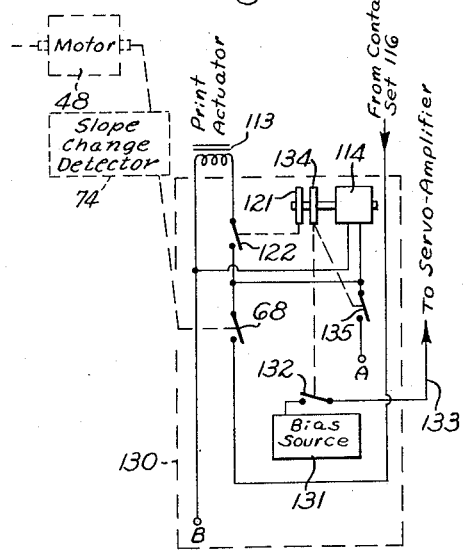
Fig. 4 is a sectional view taken along the line 4—4 of Fig. 3.
Fig. 6 is an alternative form for a portion of the instrument of Fig. 5.

The switch 68 is actuated by a mechanism 74 which senses a change in sign of the slope of the output signal connected to the amplifier, the switch being closed when the slope changes from positive to negative, and being opened when the slope changes from negative to positive. Hence, the switch 68 closes when the signal connected to the amplifier reaches a peak value or signal maximum, the closing of the switch energizing the printing circuit. In the preferred form of the invention shown herein, the switch 68 is actuated by the balance motor 48 through an overriding clutch mechanism which is shown in detail in Figs. 3 and 4. Referring to Fig. 3, the balance motor 48 drives a gear 77 which in turn drives another gear 78 carried on a fixed shaft 79. Assembled in sequence against the gear 78 and loosely fitted on the shaft 79 are a friction washer 80 of suitable composition, such as cork, a switch actuating arm 81, a second friction washer 82, a metal washer 83, a spring washer 84, and a second metal washer 85. A nut 86 is threadedly mounted on the shaft 79 for controlling the pressure exerted by the spring washer 84 on the assembly and a lock nut 87 serves to secure the entire assembly on the shaft. Referring to Fig. 4, a portion 88 of the switch actuating arm 81 is positioned between the ends of screws 90, 91 which are mounted in brackets 92, 93 providing adjustable stops for rotational movement of the arm 81. The tip portion 88 of the arm 81 engages a lever 94 of the switch 68 for closing the switch when the arm 81 is rotated clockwise, as viewed in Fig. 4, and opening the switch when the arm is rotated counterclockwise. The motor 48 is coupled to the gear 78 so that upscale movement of the chart marker assembly causes counterclockwise rotation of the arm 81 leaving the switch 68 open. When the motor reverses direction to produce a slight amount of downscale movement of the chart marker assembly, the arm 81 is moved clockwise to close the switch 68.

The switch 69 is positioned to be engaged by the chart marker assembly 43 when the assembly is within a small predetermined distance of the zero or extreme downscale position, for example, between zero and the 2% level. The switch is open when the marker assembly is at the zero position and is closed when the assembly moves upscale.

At the start of a sample analysis cycle, contact pairs 32 and 33 are open and the input to the servoamplifier is zero. The rotating contact of the selector switch 67 is engaging the fixed contact which connects with the uppermost of contact sets 33 and the printing wheel 58 is angularly disposed to place the initial printing stud in marking position, ordinarily for printing the numeral 1.

The switch 68 is closed, having remained thus since the time the marker assembly was driven downscale from the previous signal peak. The marker assembly is at the zero level and the switch 69 is open. The relay 70 is unenergized, leaving the contact set 72 closed and the balance motor 48 active. The contact set 73 is open and motors 42 and 64 are inoperative.

The motor 27 of the programming system 13 is running and the cam 28 energizes the valve actuator 26 to introduce a sample into the gas chromatograph at time $t_0$. At time $t_1$, the uppermost switch 30 is closed, resulting in closing of the corresponding contact pairs 32, 33, and a signal representing the rising slope of the first selected peak is applied to the amplifier through the corresponding attenuator resistor 36. Hence, at the time $t_1$, all of the switches in the printing circuit 45 are closed except for the deactivating or zero print prevent switch 69. Therefore, there is no printing at the zero axis. As the marker assembly is moved upscale by the balance motor 48, the switch 68 is opened and the switch 69 is subsequently closed, the printing circuit continuing to remain unenergized.

When the component peak signal reaches its maximum value and the balance motor 48 reverses direction, the switch 68 is closed and a printing cycle is initiated. The relay 70 is energized and the contact set 72 is opened to immobilize the chart marker drive and the balance motor. Contact set 73 is closed to energize the motor 64 and elevate the bar 61 causing printing by the stud on the chart. The motor 64 returns the bar 61 to its normal position and, during the return stroke, the printing wheel is advanced to place the next printing stud in printing position. The chart 41 is advanced by the chart drive motor 42 and the rotating contact of the selector switch 67 is advanced to the next fixed contact by the motor 64. The printing cycle may last a few seconds and is terminated when the selector switch 67 advances to the point of producing an open circuit in the printing circuit. The relay 70 is then de-energized and the balance motor is re-energized to move the chart marker assembly downscale as the peak signal decays. At time $t_2$, the contact pairs 32 and 33 are opened so that the amplifier input drops to zero and the recording cycle for the first selected peak is completed. A similar sequence of actions is initiated at time $t_3$ for recording the maximum value of the second peak, the second of the cams 29 closing the corresponding switch at time $t_3$ and opening the switch at time $t_4$. The third and fourth selected peaks are similarly recorded. After sufficient time has elapsed for all of the sample to be eluted from the chromatographic column, the complete cycle may be repeated by introducing another sample into the column, hence providing a record of the peak value or trend of the various selected components of the sample from the process stream.

The contact pairs 33 and the selector switch 67 act as a synchronizing system to insure proper correlation of individual peaks with corresponding indicia on the marker wheel. If upon starting of the operation the rotating contact of the selector switch 67 is in a position out of synchronism with the contact set 33, the rotating contact remains stationary and printing does not occur until closing of the particular switch of the set 33 which is coupled to the moving contact. At this time synchronous operation is commenced.

An alternative embodiment of the invention is shown in Fig. 5 wherein the gas chromatograph 10, the servo-amplifier 11 and the programming system 13 of the embodiment of Fig. 2 are used in conjunction with a different type of recorder 100. Identical elements in the two embodiments are identified by the same reference numerals. The recorder 100 includes a chart 101 which is continuously driven by a chart drive motor 102, a chart marker assembly 103 and a printing circuit 104.

The chart marker assembly 103 is slidably mounted on a splined shaft 107 and driven therealong by the cable 51 of the marker drive 44. The shaft 107 is mounted in bearings (not shown) and is driven in rotation by a switching motor 108. Rotation of the shaft 107 is coupled by gearing within a housing 109 of the marker assembly 103 to the printing wheel 58 for moving the proper printing stud into the printing position. The switching motor 108 is energized through the contact set 33 and the selector switch 67. Thus, as each of the contact pairs 33 is in succession initially closed, the switching motor 108 advances the selector switch 67 to a corresponding contact position, and advances the printing wheel 58 to a corresponding stud position preparatory to printing. The motor utilizes an energy storage spring 110 which is wound up when the motor is energized. When wound up a predetermined amount, the spring is automatically released to advance the selector switch and the printing wheel.

The printing circiut 104 includes an electromagnetic print actuator 113, a delay motor 114, the switch 68 as used in the embodiment of Fig. 2, and a delay unit 115. The delay unit 115 is energized through an additional set of contacts 116 on the relays 31 of the programming system so that the delay unit is energized during the periods that the output of the detector is coupled to the amplifier. When energized, the print actuator 113 opens a normally closed switch 117 in series between the output of the amplifier and the balance motor 48 and also actuates the bar 61 to press a printing stud against the chart. The delay unit 115 controls a normally open switch 120, closing the switch a predetermined short interval of time after the power source A, B is connected thereto by the contact set 116. The switch 120 will remain closed until the delay unit is de-energized. The delay motor 114 drives a member such as a cam 121 which, upon energization of the motor, immediately closes a normally open switch 122 and after a short interval of time, which permits the printing cycle to take place, opens the switch 122.

The operation of the recording system of Fig. 5 is similar to that of the system of Fig. 2. Prior to introduction of a sample to the gas chromatograph, all the contact sets 32, 33 and 116 are open and the input to the amplifier is zero. The switch 117 is in the closed state, the balance motor 48 is active, and the chart marker assembly 103 is at the extreme downscale or zero position.

At the time $t_1$, the output from the detector is connected to the amplifier through the contact pair 32 and the motor 108 is energized through the contact pair 33 and the selector switch 67. When energized, the motor 108 winds the spring 110 which, when wound, abruptly advances the rotating contact of the selector switch 67 to the next fixed contact and also turns the splined shaft 107 to rotate the printing wheel 58 and place the next printing stud in printing position. Advancement of the selector switch interrupts the power to the motor 108 and the motor cannot again be energized until the next selected signal peak portion of the detector output is generated and applied via the next of the switch pairs 32, as at time $t_3$. This cycle of operation of the motor 108 and the selector switch 67 occurs during the initial portion of the signal peak so that the printing wheel is in the proper position when the signal reaches its maximum.

At time $t_1$, the clutch operated switch 68 is in the closed state because of the downscale movement of the chart marker assembly at the end of the previously recorded peak. However, the switch 120 is open. The time delay unit 115 is energized at time $t_1$ through the contact set 116 and closes the switch 120 after a short interval, in the order of one or two seconds. By this time, the switch 68 has been opened by upscale movement of the chart marker assembly, thereby preventing printing at the zero or minimum position of the marker assembly. When the detector output reaches a maximum and the balance motor 48 reverses direction, the switch 68 is closed as in the embodiment of Fig. 2, energizing the delay motor 114. Operation of the delay motor immediately closes switch 122 and energizes the print actuator 113 for a short interval, during which printing occurs. The printing interval may be in the order of two seconds, the chart marker drive being de-energized during this period by opening of the switch 117. At the end of the printing interval, the switch 122 is opened by the cam 121 and motor 114 and the chart marker assembly continues its downscale travel toward zero. When the detector output is disconnected from the amplifier at time $t_2$, the recording cycle for a signal peak is completed and the system is ready for the next signal peak at time $t_3$. Other selected signal peaks in the train of peaks from the detector output are recorded in the same manner and the recording cycle may be repeated at desired intervals as in connection with the embodiment of Fig. 2.

In Fig. 6, an alternative form of printing circuit 130 is shown which may be substituted for the printing circuit 104 of the embodiment of Fig. 5. Identical elements in Figs. 5 and 6 are identified by the same reference numerals. The alternative circuit of Fig. 6 provides a different means for preventing printing at the zero or minimum downscale position of the chart marker assembly. Therein, a bias signal is connected to the servoamplifier to oppose the signal from the detector and drive the chart marker assembly to a position below zero at appropriate times. A bias source 131 provides a bias voltage which is connected to the servoamplifier 11 through a switch 132 and a line 133. The delay motor 114 drives a cam 134 in addition to the cam 121, the cam 134 actuating the switch 132 and a switch 135. One terminal of the motor 114 is connected directly to the source terminal B and the other motor terminal is connected to the source terminal A through the switch 135 and also through the switch 68 and the contact set 116. The cam 134 is set to close the switches 132, 135 immediately following opening of the switch 122 by the cam 121 at the end of the printing interval. The switches 132, 135 are opened by the cam 134 after the output from the detector has been disconnected from the amplifier and the contact set 116 has been opened by the programming system.

At the end of a recording cycle, the chart marker assembly will be at a downscale position below zero. When the bias switch 132 is opened, the marker assembly will be moved to the zero position because the input to the servoamplifier becomes zero. This upscale movement of the marker assembly will open the switch 68 and prevent energizing of the print actuator when the output from the detector or the next selected signal portion is initially connected to the amplifier. When the signal to the amplifier reaches a maximum and the balance motor changes direction, the switch 68 is closed, energizing the motor 114. This immediately closes switch 122 to actuate the printing head and momentarily stop the marker drive. Then switches 132 and 135 are closed by the cam 134 and the bias voltage is connected to the amplifier to drive the marker assembly downscale below the zero position. The switches 132 and 135 are maintained closed until after the output from the detector is disconnected from the amplifier and the contact set 116 is opened, the switch 135 providing a separate power source conenction to the motor after opening of contact set 116. The switches 132 and 135 are opened and the motor 114 stopped prior to a connection of the next signal peak to the amplifier.

It is, of course, understood that the recording system of the invention is not limited to use with the particular recorders illustrated herein. For example, the invention is equally applicable to recorders of the type wherein separate printing pens are in sequence lifted magnetically from a pen-holding mechanism and transported across the chart to record a given signal and returned to the pen holder. Furthermore, selected components from two or more separate process streams may be analyzed and recorded by a single recording system. In such an application, separate sampling valves would be used to inject the samples from the different streams into the analyzer in sequence, the valve operation being controlled by the programming system in the same manner as in the embodiment shown.

Of course, a particular recording system can be used to record the trend of a smaller number of components than the number of recording points available on the recorder. If it is desired to record two components on the apparatus of Fig. 2, the programming system would utilize only two cams and associated switches, relays and contact pairs, the first and third fixed contacts on a selector switch 67 being connected together and coupled to one contact pair 33 and the second and fourth fixed contacts being connected together and coupled to the second contact pair 33.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a signal recording system, the combination of: analyzer means for determining components of a sample; means for cyclically introducing a sample into said analyzer means, said analyzer means generating upon each cyclical introduction a train of signal peaks providing a measure respectively of different components in said sample; signal recorder means including a chart, chart driving means, a chart marker, marker driving means responsive to a signal applied to said recorder means for displacing said marker laterally with respect to said chart as a function of said signal, and means for actuating said marker for registering a mark on said chart; sensing means responsive to a change of said applied signal from positive slope to negative slope; means for sequentially applying said component signal peaks to said recorder means; and means responsive to said sensing means for operating said marker actuating means upon occurrence of said change of slope, whereby said recorder means records the trend of maximum values of said component signal peaks.

2. In a signal recording system, the combination of: analyzer means for determining components of a sample; means for cyclically introducing a sample into said analyzer means, said analyzer means generating upon each cyclical introduction a train of signal peaks providing a measure respectively of different components in said sample; signal recorder means including a chart, chart driving means, a chart marker, marker driving means responsive to a signal applied to said recorder means for displacing said marker laterally with respect to said chart as a function of said signal, and means for actuating said marker for registering a mark on said chart; sensing means responsive to a change of said applied signal from positive slope to negative slope, said sensing means comprising a switch, clutch means actuated by said marker driving means, and a driven member driven by said marker driving means through said clutch means and adapted to position said switch in first and second positions when said marker driving means displaces said marker in upscale and downscale directions, respectively; means for sequentially applying said component signal peaks to said recorder means; and means responsive to said switch when in said second position for operating said marker actuating means, whereby said recorder means records the trend of maximum values of said component signal peaks.

3. In a signal recording system, the combination of: analyzer means for determining components of a sample; means for cyclically introducing a sample into said analyzer means, said analyzer means generating upon each cyclical introduction a train of signal peaks providing a measure respectively of different components in said sample; signal recorder means including a chart, chart driving means, a chart marker, marker driving means responsive to a signal applied to said recorder means for displacing said marker laterally with respect to said chart as a function of said signal, and means for actuating said marker for registering a mark on said chart; sensing means responsive to a change of said applied signal from positive slope to negative slope, said sensing means comprising a switch, clutch means actuated by said marker driving means, and a driven member driven by said marker driving means through said clutch means and adapted to position said switch in first and second positions when said marker driving means displaces said marker in upscale and downscale directions, respectively; means for sequentially applying said component signal peaks to said recorder means; and means responsive to said switch when moved to said second position for momentarily inactivating said marker driving means and for operating said marker actuating means, whereby said recorder means records the trend of maximum values of said component signal peaks.

4. In a signal recording system, the combination of: analyzer means for determining components of a sample; means for cyclically introducing a sample into said analyzer means, said analyzer means generating upon each cyclical introduction a train of signal peaks quantitatively representative of different components in said sample; recorder means responsive to an applied signal and including a recorder chart and chart drive means; a chart marker assembly having a plurality of markers selectively positionable for marking said chart; marker driving means for displacing at least a selected one of said markers laterally of said chart as a function of said signal applied to said recorder means; cyclical switching means; programming means for synchronously operating said cyclical switching means with said cyclical sample introducing means for applying sequentially to said recorder means selected portions of said train of signal peaks; marker selecting means synchronously operable with said cyclical switching means for sequentially positioning a different selected one of said markers in chart marking position for each applied signal portion; marker actuating means for causing said selected marker momentarily to contact said chart; a two-position switch; clutch means actuated by said marker driving means and including a driven member adapted to position said switch in first and second positions, respectively, when said marker driving means drives said selected marker in upscale and downscale directions respectively; and means responsive to positioning of said switch in said second position for operating said marker actuating means, whereby said recorder means records the trend of maximum values of said component signal peaks.

5. In a signal recording system, the combination of: analyzer means for determining components of a sample; means for cyclically introducing a sample into said analyzer means, said analyzer means generating upon each cyclical introduction a train of signal peaks quantitatively representative of different components in said sample; recorder means responsive to an applied signal and including a recorder chart and chart drive means; a chart marker assembly having a plurality of markers selectively positionable for marking said chart; marker driving means for displacing at least a selected one of said markers laterally of said chart as a function of said signal applied to said recorder means; cyclical switching means; programming means for synchronously operating said cyclical switching means with said cyclical sample introducing means for applying sequentially to said recorder means selected portions of said train of signal peaks, said cyclical switching means including attenuator means for sequentially and individually attenuating in a predetermined degree said selected portions of said train of signal peaks; marker selecting means synchronously operable with said cyclical switching means for sequentially positioning a different selected one of said markers in chart marking position for each applied signal portion; marker actuating means for causing said selected marker momentarily to contact said chart; a two-position switch; clutch means actuated by said marker driving means and including a driven member adapted to position said switch in first and second positions, respectively, when said marker driving means drives said selected marker in upscale and downscale directions respectively; and means responsive to positioning of said switch in said second position for operating said marker actuating means, whereby said recorder means records the trend of maximum values of said component signal peaks.

6. In a signal recording system, the combination of: analyzer means for determining components of a sample; means for cyclically introducing a sample into said analyzer means, said analyzer means generating upon each cyclical introduction a train of signal peaks quantitatively representative of different components in said sample; recorder means responsive to an applied signal and including a recorder chart and chart drive means; a chart marker assembly having a plurality of markers selectively positionable for marking said chart; marker driving means for displacing at least a selected one of said markers laterally of said chart as a function of said signal applied to said recorder means; cyclical switching means; programming means for synchronously operating said cyclical switching means with said cyclical sample introducing means for applying sequentially to said recorder means selected portions of said train of signal peaks; marker selecting means synchronously operable with said cyclical switching means for sequentially positioning a different selected one of said markers in chart marking position for each applied signal portion; maker actuating means for causing said selected marker momentarily to contact said chart; a two-position switch; clutch means actuated by said marker driving means and including a driven member adapted to position said switch in first and second positions, respectively, when said marker driving means drives said selected marker in upscale and downscale directions respectively; means responsive to positioning of said switch in said second position for operating said marker actuating means, whereby said recorder means records the trend of maximum values of said component signal peaks; and timer means responsive to positioning of said switch in said second position for inactivating said marker driving means for a predetermined time interval.

7. In a signal recording system, the combinations of: analyzer means for determining components of a sample; means for cyclically introducing a sample into said analyzer means, said analyzer means generating upon each cyclical introduction a train of signal peaks quantitatively representative of different components in said sample; recorder means responsive to an applied signal and including a recorder chart and chart drive means; a chart marker assembly having a plurality of markers selectively positionable for marking said chart; marker driving means for displacing at least a selected one of said markers laterally of said chart as a function of said signal applied to said recorder means; cyclical switching means; programming means for synchronously operating said cyclical switching means with said cyclical sample introducing means for applying sequentially to said recorder means selected portions of said train of signal peaks; marker selecting means synchronously operable with said cyclical switching means for sequentially positioning a different selected one of said markers in chart marking position for each applied signal portion; marker actuating means for causing said selected marker momentarily to contact said chart; a two-position switch; clutch means actuated by said marker driving means and including a driven member adapted to position said switch in first and second positions, respectively, when said marker driving means drives said selected marker in upscale and downscale directions respectively; means responsive to positioning of said switch in said second position for operating said marker actuating means, whereby said recorder means records the trend of maximum values of said component signal peaks; and means for inactivating said marker actuating means during a short initial interval of application to said recorder means of each of said selected portions of said train of signal peaks, with said innitial intervals being of sufficient duration for said marker driving means to drive said selected marker in the upscale direction and switch said two-position switch to said first position.

8. In a signal recording system, the combination of: analyzer means for determining components of a sample; means for cyclically introducing a sample into said analyzer means, said analyzer means generating upon each cyclical introduction a train of signal peaks quantitatively representative of different components in said sample; recorder means responsive to an applied signal and including a recorder chart and chart drive means; a chart marker assembly having a plurality of markers selectively positionable for marking said chart; marker driving means for displacing at least a selected one of said markers laterally of said chart as a function of said signal applied to said recorder means; cyclical switching means; programming means for synchronously operating said cyclical switching means with said cyclical sample introducing means for applying sequentially to said recorder means selected portions of said train of signal peaks; marker selecting means synchronously operable with said cyclical switching means for sequentially positioning a different selected one of said markers in chart marking position for each applied signal portion; marker actuating means for causing said selected marker momentarily to contact said chart; a two-position switch; clutch means actuated by said marker driving means and including a driven member adapted to position said switch in first and second positions, respectively, when said marker driving means drives said selected marker in upscale and downscale directions respectively; means responsive to positioning of said switch in said second position for operating said marker actuating means, whereby said recorder means records the trend of maximum values of said component signal peaks; recorder biasing means operative after each contact of said marker with said chart for actuating said marker driving means to positioning the marker at a downscale position less than zero; and control means for removing such bias after termination of said applied signal portion.

9. In a signal recording system, the combination of: analyzer means for determining components of a sample; means for cyclically introducing a sample into said analyzer means, said analyzer means generating upon each cyclical introduction a train of signal peaks quantitatively representative of different components in said sample; a potentiometric recorder means including a balancing motor, a chart and a chart drive; a chart marker assembly providing a plurality of chart markers selectively positionable for printing against said chart; marker displacing means driven by said balancing motor for displacing a selectively positioned one of said markers laterally with respect to said chart as a function of a signal applied to said recorder; marker actuating means for causing said selectively positioned marker momentarily to contact said chart for printing a mark thereon; first cyclical switching means; programming means for synchronously operating said first cyclical switching means with said cyclical sample introducing means for applying sequentially to said recorder means selected portions of said train of signal peaks; rotary switch means comprising a rotatable contact and a plurality of fixed contacts, said rotatable contact being coupled to said chart marker assembly whereby different ones of said markers are positioned for printing corresponding respectively to engagement of said rotatable contact with successive ones of said fixed contacts; a drive motor for driving said rotatable contact and said chart marker assembly; a control circuit for controlling said drive motor; means for connecting said rotatable contact in operating relation in said control circuit; second cyclical switching means synchronously operable with said first cyclical switching means for inserting sequentially into said control circuit in operating relation therewith consecutive ones of said fixed contacts in step with the sequential application to said recorder of said selected signal portions, whereby engagement of said rotatable contact and said sequentially inserted fixed contacts provides off-on control of said drive motor and synchronizes positioning of said rotatable contact and said chart markers with respectively applied signal portions; a two-position switch; overrunning clutch means actuated by said balancing motor and including a driven member adapted to position said two-position switch in first and second positions, respectively, when said balancing motor drives said positioned marker in upscale and downscale directions respectively; and control means responsive to moving of said two position switch to said second position for energizing said marker actuating means and momentarily de-energizing said balancing motor.

10. A recording system as defined in claim 9 including a plurality of adjustable attenuator means for attenuating the response of said recorder means, with said first cyclical switching means sequentially connecting individual ones of said attenuator means in operative relation to said recorder means in step respectively with individual ones of said selected portions of said train of signal peaks.

11. A recording system as defined in claim 9 in which said control circuit includes a relay having the coil thereof connected in series with said two-position switch, with said relay having a plurality of sets of contacts with one of said sets adapted to deenergize said balancing motor and another of said sets adapted to energize said drive motor and said marker actuating means upon energization of said relay through said control circuit.

12. A recording system as defined in claim 11 including a deactivating switch connected in series with said coil of said relay, with said deactivating switch being actuated by said marker displacing means to deenergize said relay when said laterally displaced marker is within a small predetermined distance of its zero position.

13. A recording system as defined in claim 9 including: electromagnetic means adapted when energized to energize said marker actuating means and to de-energize said balancing motor; a time delay unit; an energizing circuit connected with said two-position switch for energizing said electromagnetic means and said time delay unit upon positioning said two-position switch in said second position; and a print timing switch coupled into said energizing circuit and actuated by said time delay unit, said time delay unit being adapted to open said print timing switch and de-energize said electromagnetic means after a predetermined interval following initial energization for permitting printing.

14. A recording system as defined in claim 13 including: delay switch means for coupling said energizing circuit to a power source; and a delay switch initiating circuit, said delay switch means being adapted after a predetermined interval following initiation to connect said energizing circuit to said power source, said initiating circut comprising third cyclical switching means operable in synchronism with said first and second switching means for initiating operation of said delay switch means upon initial application to said recorder means of each of said selected portions of said train of signal peaks.

15. A recording system as defined in claim 13 including: biasing circuit means for applying a negative signal bias to said recorder means; a bias control switch, with said time delay unit being adapted after said predetermined interval to actuate said bias control switch to apply said negative signal bias to said recorder means; locking circuit means for maintaining said bias on said recorder means until termination of the applied signal portion whose maximum is recorded during said printing interval; means for removing said bias before application to said recorder means of the next selected signal portion; and third cyclical switching means operable in synchronism with said first and second switching means for connecting said energizing circuit to a power source during successive intervals coinciding with the application to said recorder means of said selected signal portions.

16. In a single peak recording apparatus for use with a printing recorder and a gas chromatographic instrument, the instrument producing a signal which increases from a minimum to a maximum and then decreases to substantially the minimum, the recorder including a printing head, traverse means for translating the printing head, and a printing circuit for actuating the printing head, the combination of: a programming switch for introducing a sample into the instrument and connecting the instrument output to the recorder at predetermined time intervals; zero print prevent means for deactivating the printing circuit at the time the instrument output is connected to the recorder; peak print means for energizing the printing circuit when the signal changes slope from an increasing to a decreasing value; and means for coupling the record traverse means to said peak print means whereby a change in direction of translation of the printing head from increasing to decreasing signal actuates said peak print means.

17. In a signal peak recording apparatus for use with a printing recorder and a gas chromatographic instrument or the like, the instrument producing a train of signals each of which increases from a minimum to a maximum and then decreases to substantially the minimum, the recorder including a printing head, traverse means for translating the printing head, and a printing circuit for actuating the printing head, the combination of: a programming switch for introducing a sample into the instrument and connecting the instrument output to the recorder at predetermined time intervals, whereby selected signals of the train are available for recording, with each selected signal driving the printing head to a maximum which is a function of the peak value of the signal; zero print prevent means for deactivating the printing circuit at the time each selected signal is connected to the recorder; peak print means for energizing the printing circuit when each selected signal changes slope from an increasing to a decreasing value; and means for coupling the traverse means to said peak print means whereby a change in direction of translation of the printing head from upscale to downscale actuates said peak print means.

18. In a trend recording apparatus for use with a printing recorder and a gas chromatographic instrument or the like, the instrument producing a train of signals each of which increases from a minimum to a maximum and then decreases to substantially the minimum, the recorder including a printing head, traverse means for translating the printing head, and a printing circuit for actuating the printing head, the combination of: a programming switch for cyclically introducing a sample into the instrument and connecting the instrument output to the recorder at predetermined time intervals, whereby selected signals of the train are cyclically available for recording, with each selected signal driving the printing head to a maximum which is a function of the peak value of the signal; zero print prevent means for deactivating the printing circuit at the time each selected signal is connected to the recorder; peak print means for energizing the printing circuit when each selected signal changes slope from increase to decrease; a selector switch having a plurality of channels; circuit means for connecting said selector switch in series in the printing circuit, with said programming switch cyclically connecting a power source to successive channels of said selector switch; means for coupling the traverse means to said peak print means whereby a change in direction of translation of the printing head from upscale to downscale actuates said peak print means; and means for intercoupling the printing head and said selector switch to step said selector switch to the next channel when the printing head is actuated.

References Cited in the file of this patent

UNITED STATES PATENTS 2,575,711     Hipple et al. _____ Nov. 20, 1951